US006803802B2

(12) United States Patent
Bae et al.

(10) Patent No.: US 6,803,802 B2

(45) Date of Patent: Oct. 12, 2004

(54) SWITCHED-CAPACITOR INTEGRATOR

(75) Inventors: Chang-Min Bae, Ichon-shi (KR); Soo-Chang Choi, Ichon-shi (KR)

(73) Assignee: Hynix Semiconductor Inc., Ichon-shi (KR)

( * ) Notice: Subject to any disclaimer, the term of this patent is extended or adjusted under 35 U.S.C. 154(b) by 188 days.

(21) Appl. No.: 10/179,229

(22) Filed: Jun. 26, 2002

(65) Prior Publication Data

US 2003/0099233 A1 May 29, 2003

(30) Foreign Application Priority Data

Nov. 29, 2001 (KR) .................................. 10-2001-74985

(51) Int. Cl.[7] .................................................. G06F 7/64

(52) U.S. Cl. ........................ 327/337; 327/344; 327/345

(58) Field of Search .............................. 327/91, 93–96, 327/336, 337, 344, 345, 554, 558, 65

(56) References Cited

U.S. PATENT DOCUMENTS 6,087,860 A * 7/2000 Liu et al. ...................... 327/65
6,617,908 B1 * 9/2003 Thomsen et al. ........... 327/337

FOREIGN PATENT DOCUMENTS

JP 1-265375 10/1989 .......... G06G/7/186
JP 6-301800 10/1994 .......... G06G/7/186

OTHER PUBLICATIONS

Mohammed Ismail, et al.; *"Analog VLSI Signal and Information Processing"*; McGraw–Hill International Editions, Electrical Engineering Series; 1994; p. 416.

L.P. Huelsman, et al.; *"Introduction to the Theory and Design of Active Filters"*; 1980; p. 127.

Johns & Martin; *Analog Integrated Circuit Design*; John Wiley & Sons; 1997; pp. 404–406.

Razavi; *Design of Analog CMOS Integrated Circuits*; Mcgraw–Hill; Preview Edition 2000; p. 423 & p. 425.

* cited by examiner

*Primary Examiner*—Long Nguyen
(74) *Attorney, Agent, or Firm*—Jacobson Holman PLLC

(57) ABSTRACT

A switched-capacitor integrator eliminates noise caused by the switching of an input signal. For this purpose, the integrator includes a switched-capacitor unit for providing a capacitor with one of a first and a second input voltage in response to clock signals, a reference voltage providing unit for receiving a reference voltage and outputting an amplified reference voltage, a switching noise eliminating unit for maintaining an output of the reference voltage providing unit at a stabilized voltage level, an operational amplifying unit for receiving an output of the switched-capacitor unit as its negative input and the output of the reference voltage providing unit passed through the switching noise eliminating unit as its positive input and a feedback capacitor for feeding back an output of the operational amplifying unit to the negative input.

6 Claims, 4 Drawing Sheets

SWITCHED-CAPACITOR INTEGRATOR

FIELD OF THE INVENTION

The present invention relates to a switched-capacitor integrator and, more particularly, to a switched-capacitor integrator for eliminating switching noise.

DESCRIPTION OF RELATED ART

FIG. 1A shows a circuit diagram of a typical integrator which is a basic filter circuit in an electronic circuit implementing filters. The integrator includes an operational amplifier A for amplifying voltage passing through its negative input node and for outputting an output voltage signal $V_{out}(t)$, a feedback capacitor $C_2$ connecting the negative input node and an output node of the operational amplifier A and a resistor $R_1$ connecting a voltage input node of $V_{in}(t)$ and the negative input node of the operational amplifier A. The transfer function and frequency characteristics of the integrator are $H(s)=-1/R_1C_2*1/s$.

When embodying the integrator of FIG. 1A in an integrated circuit, the resistor and capacitor of the integrator have accuracy errors of approximately 5% and 1%, respectively. These errors vary substantially with the operation environment, such as manufacturing process, temperature and use time, making it difficult to obtain accurate and reliable frequency characteristics. Therefore, in order to solve the above problem of the integrated circuit, there has been introduced a switched-capacitor circuit illustrated in FIG. 1B.

The switched-capacitor circuit will be explained with reference to FIG. 1B.

First of all, $\phi_1$ and $\phi_2$ are non-overlapping two-phase clock signals and a charge of $Q_1=C_1*V_1$ is stored in $C_1$ while $\phi_1$ has a '1' state. After one half period of the two-phase clock signals $\phi_1$ and $\phi_2$, wherein $\phi_2$ has a '1' state, $C_1$ is coupled with $V_2$ and, thus, a charge of $Q_2=C_1*V_2$ is stored in $C_1$. At this time, a charge of $\Delta Q=C_1(V_1-V_2)$ flows from the switched-capacitor $C_1$. Therefore, during the one clock period T, an average current of $I=\Delta Q/T=C_1(V_1-V_2)/T$, which can be represented as $(V_1-V_2)/R_{eq}$, flows from $V_1$ to $V_2$. Accordingly, the switched-capacitor circuit can be implemented by using an equivalent resistor $R_{eq}$.

The switched-capacitor circuit can be readily integrated on a single chip through the use of a CMOS manufacturing process and has advantages of removing resistors and reducing power consumption. As a result, it can be used in almost any analog integrated filter. Further, a filter using the switched-capacitor circuit expresses the frequency characteristics of the integrator as a capacitance ratio and, therefore, it can provide high accuracy and operational reliability.

Referring to FIG. 1C, there is provided an integration circuit using a switched-capacitor.

The switched-capacitor integrator includes an operational amplifier A, a capacitor $C_2$ connected between a negative input node and an output node of the operational amplifier A, two switches $S_1$ and $S_2$ and a capacitor $C_1$ connected between a connection node of the two switches $S_1$ and $S_2$ and a ground voltage node. The switches $S_1$ and $S_2$ alternately perform a switching operation in response to the non-overlapping two-phase clock signals $\phi_1$ and $\phi_2$ as described above.

When forming a capacitor on a practical integrated circuit, parasitic capacitance occurs at both ends of the capacitor, which has an influence on the frequency characteristics of the integrator. In order to exclude this influence, both ends of the parasitic capacitance should be connected to a certain voltage, a ground voltage source or the input or output node of the operational amplifier A at any clock signal $\phi_1$ or $\phi_2$ to avoid their floating states.

FIG. 1D illustrates a switched-capacitor integrator performing an integration operation regardless of the parasitic capacitance through the use of the above scheme.

The switched-capacitor integrator of FIG. 1D further includes switches $S_3$ and $S_4$ at both ends of the capacitor C1 shown in FIG. 1C. Switches $S_3$ and $S_4$ operate alternately in response to the non-overlapping two-phase clock signals $\phi_1$ and $\phi_2$, respectively, like the switches $S_1$ and $S_2$.

Herein, capacitors $C_{P1L}$, $C_{P1R}$, $C_{P2L}$ and $C_{P2R}$ represent parasitic capacitance caused at both ends of the capacitors $C_1$ and $C_2$, respectively.

At first, when considering the parasitic capacitors $C_{P1L}$ and $C_{P1R}$ related to the capacitor $C_1$, one end of the parasitic capacitor $C_{P1L}$ is connected to an input voltage $V_{in}$ if an actuated clock input, e.g., having a '1' state, is $\phi_1$ and, thus, the switch $S_1$ is on. On the other hand, the other end of the parasitic capacitor $C_{P1L}$ is attached to the ground voltage source if the actuated clock input is $\phi_2$ and, thus, the switch $S_4$ is on. In the mean time, one end of the parasitic capacitor $C_{P1R}$ is coupled to the ground voltage source if the actuated clock input is $\phi_1$ and, thus, the switch $S_3$ is on. On the other hand, the other end of the parasitic capacitor $C_{P1R}$ is attached to a negative input node of the operational amplifier A if the actuated clock input is $\phi_2$ and, thus, the switch $S_2$ is on. As a result, both ends of the parasitic capacitor are connected to a certain voltage, such as $V_{in}$, the ground voltage source or the input node of the operational amplifier A, at any actuated clock signal $\phi_1$ or $\phi_2$.

Meanwhile, the parasitic capacitor $C_{P2L}$ of capacitor $C_2$ is always connected to a virtual ground voltage source and the parasitic capacitor $C_{P2R}$ of capacitor $C_2$ is attached to the output node of the operational amplifier A. Therefore, the parasitic capacitors $C_{P2L}$ and $C_{P2R}$ do not have an influence on the operation of the integrator.

Referring to FIG. 2, there is shown a circuit diagram of a switched-capacitor integrator including a reference voltage unit in addition to the integrator of FIG. 1D.

The switched-capacitor integrator comprises a first and a second switch $SW_1$ and $SW_2$ providing input signals $V_a$ and $V_b$, respectively, to one end of an input capacitor $C_1$, a first operational amplifier A1 receiving a reference voltage $V_c$ as its positive input and whose output node is connected with its negative input node, a third switch $SW_3$ connecting the output node $N_2$ of the first operational amplifier A1 with the other end $N_1$ of the input capacitor $C_1$, a second operational amplifier A2 receiving a signal from the input capacitor $C_1$ through a fourth switch $SW_4$ as its positive input and the output of the first operational amplifier A1 as its negative input, and a feedback capacitor $C_2$ connecting an output signal $V_{out}$ with the negative input of the second operational amplifier A2.

Hereinafter, the operation of the switched-capacitor integrator employing the reference voltage unit will be explained with reference to FIG. 2. As described above, $\phi_1$ and $\phi_2$ are the non-overlapping two-phase clock signals. Furthermore, the first and third switches $SW_1$ and $SW_3$ operate in response to the first phase clock signal $\phi_1$ and the second and fourth switches $SW_2$ and $SW_4$ operate under the control of the second phase clock signal $\phi_2$.

That is, if the first phase clock signal $\phi_1$ is actuated and, thus, the first and third switches $SW_1$ and $SW_3$ are on, a charge of $C_1(V_a-V_c)$ is stored in the input capacitor C1. On the other hand, if the second phase clock signal $\phi_2$ is actuated and, thus, the second and fourth switches $SW_2$ and $SW_4$ are on, a charge of $C_1(V_b-V_c)$ is stored in the input capacitor $C_1$. Therefore, during one clock period, a charge of $\{C_1(V_a-V_c)\}-\{C_1(V_b-V_c)\}=C_1(V_a-V_b)$moves from the input capacitor $C_1$ to the feedback capacitor $C_2$ according to the law of conservation of quantity of electric charge.

When the actuated clock signal changes from $\phi_2$ to $\phi_1$, the amount of charge stored in the input capacitor $C_1$ cannot change suddenly from $C_1(V_b-V_c)$ to $C_1(V_a-V_c)$ and, therefore, the instant voltage of the input capacitor $C_1$ is maintained at $V_b-V_c$. However, since the input voltage changes from $V_b$ to $V_a$ at the moment when the actuated clock signal becomes $\phi_1$, the voltage at the output node $N_2$ of the first operational amplifier changes instantaneously to maintain the instant voltage across the capacitor $C_1$ at $V_b-V_c$, causing switching noise to occur.

Since this switching noise influences all of the characteristics of the integration circuit, it should be minimized. Further, since the node $N_2$ where the switching noise occurs is connected to the positive input of the second operational amplifier A2, it is necessary to eliminate the switching noise.

SUMMARY OF THE INVENTION

It is, therefore, a primary object of the present invention to provide a switched-capacitor integrator capable of eliminating noises caused by the switching of an input signal.

In accordance with the present invention, there is provided a switched-capacitor integrator including a resistor and a capacitor connected to an input node of an operational amplifier to eliminate switching noise caused when a voltage at the input node of the operational amplifier is instantaneously changed. As a result, since the voltage at the input node varies according to a time constant $\tau$=RC, the switching noise can be eliminated by adjusting the resistance R and the capacitance C. This allows the voltage at the input node of the operational amplifier to be virtually constant.

BRIEF DESCRIPTION OF THE DRAWINGS

The above and other objects and features of the present invention will become apparent from the following description of preferred embodiments taken in conjunction with the accompanying drawings, in which.

DETAILED DESCRIPTION OF THE INVENTION

Hereinafter, a preferred embodiment of the present invention will be described in detail with reference to the accompanying drawings.

Figure 1A:
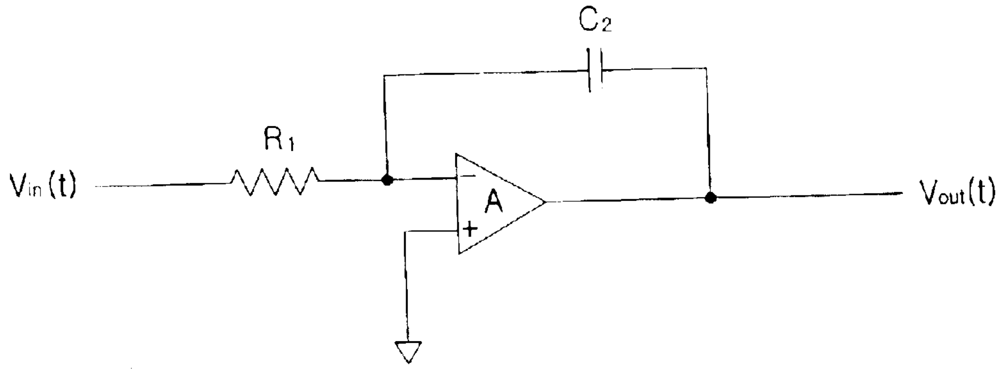
FIG. 1A (PRIOR ART)
FIGS. 1A to 1D show circuit diagrams of conventional integrators.
Figure 1B:
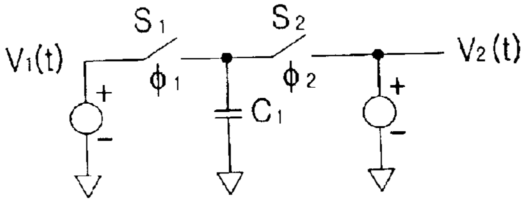
FIG. 1B (PRIOR ART)
Figure 1C:
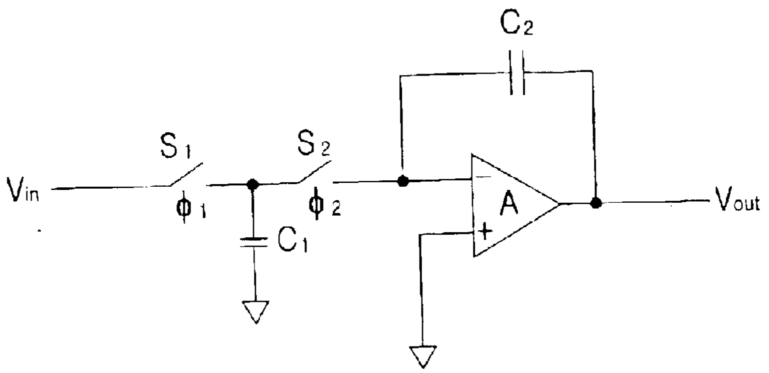
FIG. 1C (PRIOR ART)
Figure 1D:
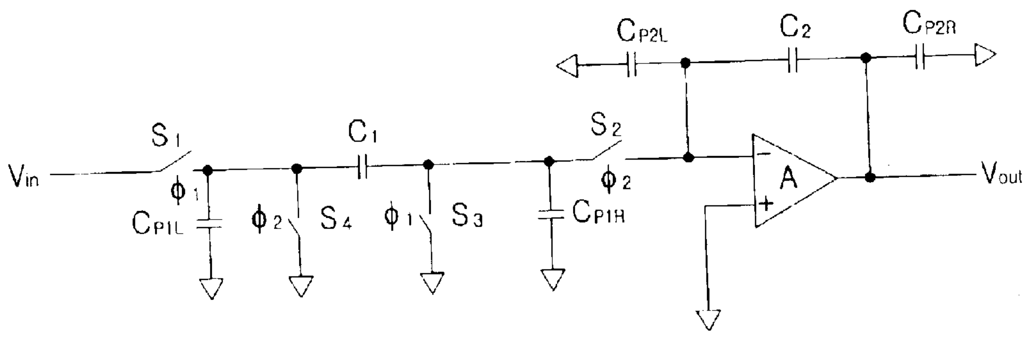
FIG. 1D (PRIOR ART)
Figure 2:
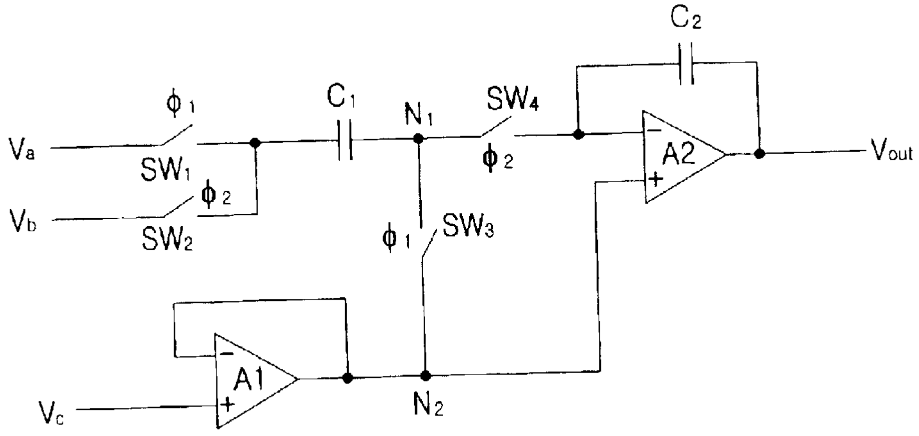
FIG. 2 (PRIOR ART)
FIG. 2 provides a circuit diagram of a conventional integrator including a reference voltage unit in addition to the integrator shown in FIG. 1D.
Figure 3:
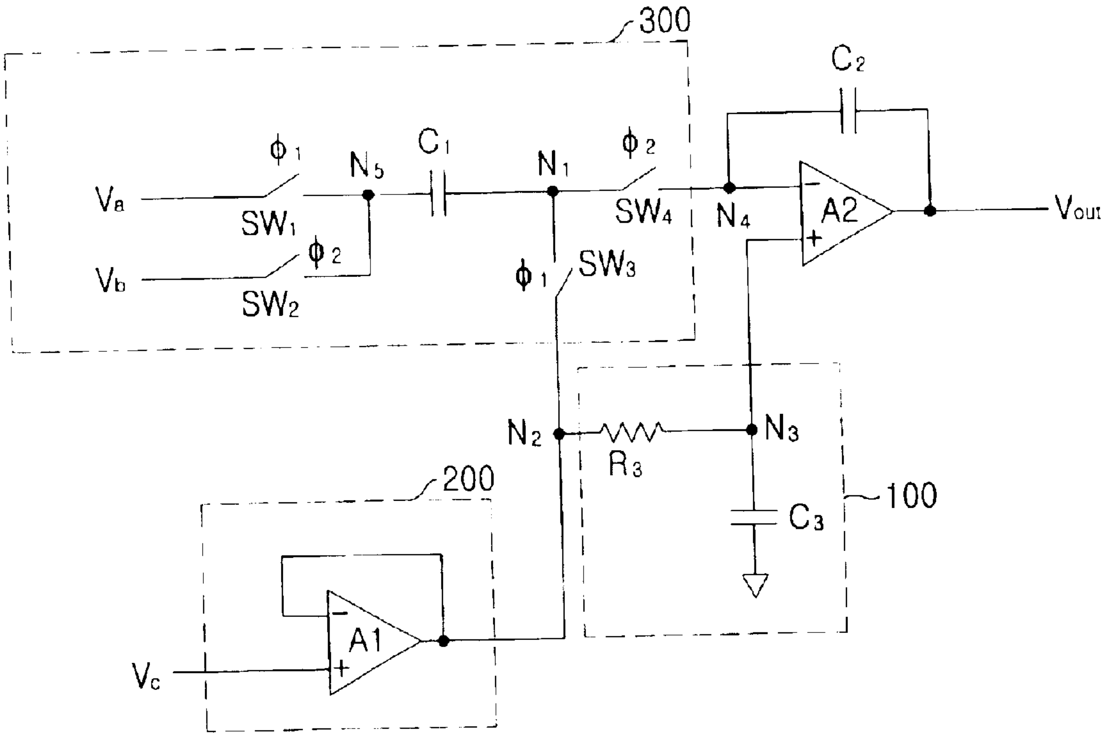
FIG. 3 illustrates a circuit diagram of a switched-capacitor integrator in accordance with an embodiment of the present invention.

Referring to FIG. 3, there is illustrated a switched-capacitor integrator in accordance with a preferred embodiment of the present invention.

The switched-capacitor integrator comprises a switched-capacitor unit 300 for supplying a first or a second input voltage $V_a$ or $V_b$ to a capacitor therein by using switches operating in response to clock signals, a reference voltage providing unit 200 for receiving a reference voltage $V_c$ and outputting an amplified reference voltage, a switching noise eliminating unit 100 for maintaining an output of the reference voltage providing unit 200 at a stabilized voltage level, an operational amplifier A2 for receiving an output of the switched-capacitor unit 300 as its negative input and the output of the reference voltage providing unit 200 passed through the switching noise eliminating unit 100 as its positive input and a feedback capacitor $C_2$ for feeding back an output $V_{out}$ to the negative input node $N_4$ of the operational amplifier A2.

The switched-capacitor unit 300 includes a first capacitor $C_1$ and a first switch $SW_1$ for providing the first input voltage $V_a$ to one end $N_5$ of the first capacitor $C_1$, a second switch $SW_2$ for supplying the second input voltage $V_b$ to the one end $N_5$ of the first capacitor $C_1$, a third switch $SW_3$ for connecting the other end $N_1$ of the first capacitor $C_1$ with an output node $N_2$ of the reference voltage providing unit 200 and a fourth switch $SW_4$ for attaching the other end $N_1$ of the first capacitor $C_1$ to the negative input node $N_4$ of the operational amplifier A2.

The reference voltage providing unit 200 employs a first operational amplifier A1 which receives the reference voltage $V_c$ as its positive input and whose output is fed back to its negative input.

The switching noise eliminating unit 100 contains a resistor $R_3$ connected between the output node $N_2$ of the operational amplifier A1 and the positive input node $N_3$ of the operational amplifier A2, and a second capacitor $C_3$ located between the positive input node $N_3$ of the operational amplifier A2 and a ground voltage node.

Figure 4:
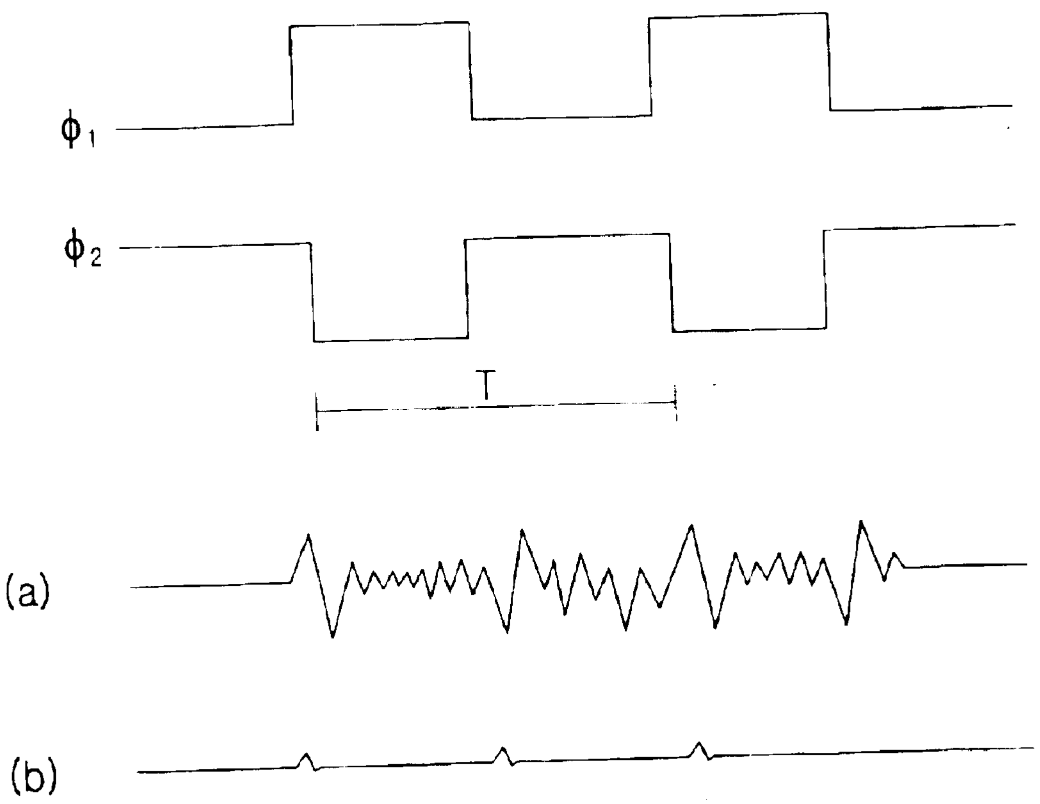
FIG. 4 is a waveform diagram showing a voltage signal of the inventive integrator of FIG. 3 and that of the conventional integrator at a positive input node of a second operational amplifier.

FIG. 4 provides a waveform diagram showing a voltage signal (b) of the inventive integrator in FIG. 3 and a voltage signal (a) of the conventional integrator at the positive input node of the operational amplifier A2.

Hereinafter, the operation of the inventive switched-capacitor integrator will be described with reference to FIGS. 3 and 4.

As mentioned before, $\phi_1$ and $\phi_2$ are the non-overlapping two-phase clock signals. The first and third switches $SW_1$ and $SW_3$ operate in response to the first phase clock signal $\phi_1$ and the second and fourth switches $SW_2$ and $SW_4$ operate in response to the second phase clock signal $\phi_2$.

When the first phase clock signal $\phi_1$ is enabled and, thus, the first and third switches $SW_1$ and $SW_3$ are on, a charge of $C_1(V_a-V_c)$is stored in the first capacitor $C_1$. On the other hand, when the second phase clock signal $\phi_2$ is enabled and, thus, the second and fourth switches $SW_2$ and $SW_4$ are on, a charge of $C_1(V_b-V_c)$ is stored in the first capacitor $C_1$. Therefore, during one clock period T, the amount of charge moving from the first capacitor $C_1$ to the feedback capacitor $C_2$ is $\{C_1(V_a-V_c)\}-\{C_1(V_b-V_c)\}=C_1(V_a-V_b)$ accord conservation of quantity of electric charge.

When the actuated clock signal changes from $\phi_2$ to $\phi_1$, the amount of charge stored in the first capacitor $C_1$ cannot change suddenly from $C_1(V_b-V_c)$ to $C_1(V_a-V_c)$ and, therefore, the input capacitor $C_1$ maintains an instant voltage of $V_b-V_c$. However, since the input voltage changes from $V_b$ to $V_a$ at the moment when the actuated clock signal becomes $\phi_1$, the voltage at the output node $N_2$ of the first operational amplifier A1 changes instantaneously to maintain the instant voltage across the capacitor $C_1$ at $V_b-V_c$. As a result, switching noise occurs.

However, in accordance with the present invention, since the switching noise eliminating unit 100 is employed between the output node $N_2$ of the reference voltage providing unit 200 and the positive input node $N_3$ of the second operational amplifier A2, problems do not occur in operating the integrator despite the sudden variation of voltage at node $N_2$ and it is possible to maintain a constant voltage at node $N_3$.

Namely, since the voltage at node $N_3$ is dependent on a time constant $\tau$=RC of the resistor $R_3$ and the capacitor C3, although the voltage at node $N_2$ is instantaneously changed, the voltage at node $N_3$ can be maintained almost unchanged by adjusting the resistance R and the capacitance C of the resistor $R_3$ and the capacitor $C_3$, respectively.

Finally, since the switching noise eliminating unit 100 removes high frequency noise, it can be constructed using a low-pass filter.

As described above, in accordance with the present invention, it is possible to eliminate the switching noise caused in the integration circuit and, thus, guarantee a stable circuit operation.

While the present invention has been described with respect to the particular embodiments, it will be apparent to those skilled in the art that various changes and modifications may be made without departing from the spirit and scope of the invention as defined in the following claims.

What is claimed is:

1. A switched-capacitor integrator for generating an integrated signal of an input signal comprising:

switched-capacitor means having a capacitor for storing one of a first and a second input voltages in response to clock signals to thereby output the stored voltage.

reference voltage providing means for receiving a reference voltage and outputting an amplified reference voltage;

switching noise eliminating means for eliminating a noise of the amplified reference voltage received from said reference voltage providing means; and operational amplifying means for receiving the stored voltage as its negative input and the amplified reference voltage passed through the switching noise eliminating means as its positive input to thereby generate the integrated signal.

2. The switched-capacitor integrator as recited in claim 1, wherein the switching noise eliminating means comprises a low-pass filter.

3. The switched-capacitor integrator as recited in claim 2, wherein the switching noise eliminating means includes:

a resistor connected between the output node of the reference voltage providing means and the positive input node of the operational amplifying means; and a capacitor connected between the positive input node of the operational amplifying means and a ground voltage node.

4. The switched-capacitor integrator as recited in claim 1, wherein the reference voltage providing means comprises an operational amplifier which receives the reference voltage as its positive input and whose output is fed back to its negative input node.

5. The switched-capacitor integrator as recited in claim 1, wherein the switched-capacitor means includes:

the capacitor;

a first switch for providing the first input voltage to a first end of said capacitor;

a second switch for supplying the second input voltage to the first end of said capacitor;

a third switch for connecting a second end of said capacitor to the output node of the reference voltage providing means; and a fourth switch for connecting the second end of said capacitor to the negative input node of the operational amplifying means.

6. The switched-capacitor integrator as recited in claim 1, wherein the operational amplifying means includes a feedback capacitor for feeding back the integrated signal to said negative input.

* * * * *